(12) United States Patent
Tamizier et al.

(10) Patent No.: US 11,221,141 B2
(45) Date of Patent: Jan. 11, 2022

(54) ASSEMBLY FOR A TURBOMACHINE

(71) Applicants: Julien Michel Tamizier, Moissy-Cramayel (FR); Christophe Bernard Texier, Moissy-Cramayel (FR); Damien Bonneau, Moissy-Cramayel (FR); Damien Bonnefoi, Moissy-Cramayel (FR); François Xavier Chapelle, Moissy-Cramayel (FR)

(72) Inventors: Julien Michel Tamizier, Moissy-Cramayel (FR); Christophe Bernard Texier, Moissy-Cramayel (FR); Damien Bonneau, Moissy-Cramayel (FR); Damien Bonnefoi, Moissy-Cramayel (FR); François Xavier Chapelle, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/260,719

(22) PCT Filed: Jul. 18, 2019

(86) PCT No.: PCT/FR2019/051805
§ 371 (c)(1),
(2) Date: Jan. 15, 2021

(87) PCT Pub. No.: WO2020/016533
PCT Pub. Date: Jan. 23, 2020

(65) Prior Publication Data
US 2021/0302018 A1    Sep. 30, 2021

(30) Foreign Application Priority Data
Jul. 19, 2018   (FR) ...................................... 1856712

(51) Int. Cl.
*F23R 3/00*   (2006.01)
*F02C 3/14*   (2006.01)
*F23R 3/10*   (2006.01)

(52) U.S. Cl.
CPC ................ *F23R 3/005* (2013.01); *F02C 3/14* (2013.01); *F23R 3/10* (2013.01); *F05D 2240/35* (2013.01); *F05D 2260/202* (2013.01)

(58) Field of Classification Search
CPC .... F23R 3/42; F23R 3/60; F23R 3/005; F23R 3/10; F02C 3/14; F05D 2240/35
See application file for complete search history.

(56) References Cited

U.S. PATENT DOCUMENTS 5,289,677 A * 3/1994 Jarrell ....................... F23R 3/60
                                                                      60/752
5,417,545 A * 5/1995 Harrogate ............... F01D 9/023
                                                                     415/115

(Continued)

FOREIGN PATENT DOCUMENTS

| EP | 2042806 A1 | 4/2009 |
| FR | 2887588 A1 | 12/2006 |
| FR | 3004518 A1 | 10/2014 |

OTHER PUBLICATIONS

International Search Report dated Oct. 11, 2019, issued in corresponding International Application No. PCT/FR2019/051805, filed Jul. 18, 2019, 2019, 5 pages.

(Continued)

*Primary Examiner* — Craig Kim
(74) *Attorney, Agent, or Firm* — Christensen O'Connor Johnson Kindness PLLC

(57) ABSTRACT

A turbomachine includes a combustion chamber with a radially extending downstream flange at its downstream end. A distributor is disposed downstream of the combustion chamber and includes a platform from which at least one (Continued)

vane extends radially. The platform has an upstream edge extending radially and delimiting, with the downstream flange disposed opposite, a gap opening into the combustion chamber at its radially inner end and closed at its radially outer end by sealing means fixed to the distributor. The downstream flange of the combustion chamber has at least one rectilinear cooling orifice passing through the flange and opening into the gap opposite the platform of the distributor.

8 Claims, 4 Drawing Sheets

(56) References Cited

U.S. PATENT DOCUMENTS

| | | |
|---|---|---|
| 8,291,709 B2 | 10/2012 | Cayre et al. |
| 9,650,903 B2 * | 5/2017 | Hoke .................. F01D 9/041 |
| 10,344,977 B2 * | 7/2019 | Mulcaire ............. F23R 3/002 |
| 2007/0134088 A1 * | 6/2007 | Lee ...................... F01D 9/00 |
| | | 415/209.2 |
| 2007/0144177 A1 * | 6/2007 | Burd ................... F01D 9/023 |
| | | 60/752 |
| 2009/0077977 A1 * | 3/2009 | Cayre ................. F23R 3/06 |
| | | 60/757 |

OTHER PUBLICATIONS

Written Opinion dated Oct. 11, 2019, issued in corresponding International Application No. PCT/FR2019/051805, filed Jul. 18, 2019, 6 pages.

* cited by examiner

ASSEMBLY FOR A TURBOMACHINE

FIELD OF THE INVENTION

The present invention relates to an assembly for a turbomachine, such as, for instance, an airplane turbojet engine or a turboprop engine.

BACKGROUND OF THE INVENTION

Such an assembly is known from document FR 3 004 518 on behalf of the applicant and is illustrated in FIGS. 1 and 2. This comprises an annular combustion chamber 1 arranged downstream of a compressor and a diffuser (not shown) and upstream of an inlet distributor 2 of a high-pressure turbine.

Combustion chamber 1 comprises inner and outer walls of revolution, called inner shell 3 and outer shell 4 respectively, which extend inside each other and are connected upstream to an annular chamber bottom wall (not shown).

In order to limit the deformation of the internal 3 and external 4 shells, the latter are equipped at their downstream end with internal and external flanges 6. Each flange 6 is annular and has a U-shaped or pin-shaped section. Each flange 6 extends radially inwards or outwards and has a radial portion 7a attached to the inner shell 3 or outer shell 4 of combustion chamber 1. The free end 6a of each flange 6 is furthermore intended to cooperate with an inner housing 8 or an outer housing 9 of chamber 1. A cylindrical part 7b extends downstream from the radial part 7a of flange 6.

Distributor 2 is attached downstream of chamber 1 by suitable means and consists of inner 11 and outer 12 platforms which are connected to each other by substantially radial vanes 13. The outer platform 12 of distributor 2 is axially aligned with the downstream end portion of the outer shell 4 of chamber 1, and its inner platform 11 is axially aligned with the downstream end portion of the inner shell 3 of chamber 1. The upstream end of each platform 11, 12 of distributor 2 has a radial flange 14 of smaller size than the radial part 7a of the corresponding flange 6 of combustion chamber 1.

A distributor assembly 2 is typically mounted downstream of the combustion chamber and comprises several distributors whose platforms are ring sectors, with the distributor platforms mounted circumferentially end to end to create a fluid flow channel downstream of the combustion chamber.

Radial parts 7a and flanges 14 delimit, for each shell 3, 4, an internal annular gap 15 which opens at one end into chamber 1 and is closed at its other end by sealing means 16.

As can be best seen in FIG. 2, these seals 16 have sealing lamellae 17 extending radially and circumferentially along each distributor 2 sector. Each lamella 17 can be sealingly supported on a radial face of the corresponding flange 14 of distributor 2 and on the free end of the axial part 7b of the corresponding flange 6 of combustion chamber 1. Lamellae 17 are held in contact with said parts 7b, 14 by means of elastic return means.

These elastic means are e.g. conically shaped coil springs 18 mounted around screws 19 which are screwed into lugs 20 extending radially from the corresponding shell 11, 12 of distributor 2. The downstream parts 21 of the inner and outer shells 3, 4 may have multi-perforations 22. During operation of the turbomachine, bypass air 23 flows into spaces 24 and 25 bounded respectively by the outer housing 9 and outer shell 4 on the one hand, and the inner housing 8 and inner shell 3 on the other. This bypass air 23 passes through the multi-perforations 22, so as to limit the heating of the downstream parts 21 of the internal and external shells 3, 4.

The upstream end of each shell 11, 12 of distributor 2 generally forms a setback 26 or step to avoid the formation of a hot flow shut-off point from combustion chamber 1. However, such a setback forms local recirculations of the hot gas flow, which could generate premature degradation of the corresponding platform 11, 12 of distributor 2.

Such another assembly is also known from document FR 2 887 588.

The invention more particularly aims at providing a simple, efficient and cost-effective solution to this problem.

SUMMARY OF THE INVENTION

The present invention relates first of all to an assembly for a turbomachine, comprising:
a combustion chamber comprising at its downstream end a radially extending downstream flange,
a distributor disposed downstream of the combustion chamber and comprising a platform from which at least one vane extends radially, the platform comprising an upstream edge extending radially and delimiting, with the downstream flange disposed opposite, a gap opening into the combustion chamber at its radially inner end and closed at its radially outer end by sealing means fixed to the distributor,
characterised in that the downstream flange of the combustion chamber has at least one rectilinear cooling orifice passing through said flange and opening into the gap facing the distributor platform.

Air bypassing the combustion chamber can then pass through said orifice and impact the distributor shell so as to cool it efficiently and avoid its degradation by the recirculation of hot gas downstream of the combustion chamber. The cooling air flowing through said orifice opens into the annular gap, thereby increasing the size of the cooled zone of the distributor shell. After cooling of the shell, the air in said annular gap is directed radially inwards before emerging at the downstream end of the combustion chamber, and forming films suitable for cooling the distributor platforms.

The terms axial and radial are defined relative to the X axis. The terms upstream and downstream are defined relative to the gas flow through the turbomachine.

The sealing means may comprise at least one lamella extending radially and circumferentially and bearing axially on the downstream flange of the combustion chamber and on the upstream edge of the distributor.

The lamella can be returned to rest on the corresponding flange of the combustion chamber and on the corresponding distributor shell, thanks to elastic return means.

The elastic return means may comprise at least one compression spring, e.g. a cylindrical or conical helical spring.

The radial portion of the downstream flange of the combustion chamber may have at least two cooling orifices passing through the downstream flange and opening into gap, two of said orifices extending in two directions at an angle to each other.

The assembly may have at least one orifice inclined in a first circumferential direction and at least one orifice inclined in a second circumferential direction, opposite to the first circumferential direction.

Each of said orifices is thus inclined with respect to the radial plane. The angle of inclination with respect to the radial plane is for example between 15 and 75°, for example around 45°.

This assembly may have at least one axially oriented hole.

This means that the orifice is not inclined in the circumferential direction but is oriented parallel to the axis of the turbomachine.

The assembly may comprise at least one first axially oriented orifice, and at least one second and one third orifice located circumferentially on either side of the first orifice, the second and third orifices being inclined in two opposite circumferential directions.

The assembly may have at least one fourth orifice and at least one fifth orifice, located respectively circumferentially on either side of the second and third orifices, opposite the first orifice, the fourth and fifth orifices being oriented axially.

Orifices may have multiple circumferential inclinations. This ensures a more homogeneous air film cooling of the distributor platforms compared to bores that are inclined in the same direction.

The assembly may have at least two orifices radially and circumferentially offset from each other.

The edges of the orifices leading into the gap can be offset from each other by a distance of between 0.1 and 6 mm.

Orifices can be cylindrical. The orifices can have a diameter between 0.1 mm and 6 mm, for example around 1 mm.

The invention may also relate to a turbomachine, such as an airplane turbojet or turboprop engine, with a assembly of the above-mentioned type.

The invention will be better understood and other details, characteristics and advantages of the invention will appear when reading the following description, which is given as a non-limiting example, with reference to the attached drawings.

DETAILED DESCRIPTION

Figure 1:
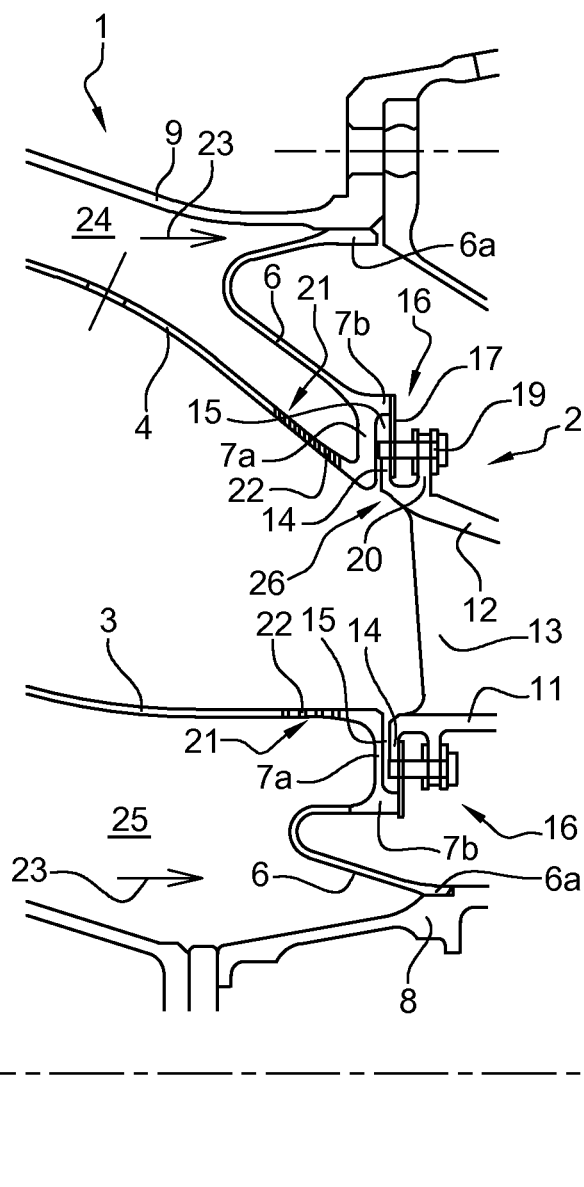
FIG. 1 is a schematic half-view in axial cross-section of a prior art assembly part.
Figure 2:
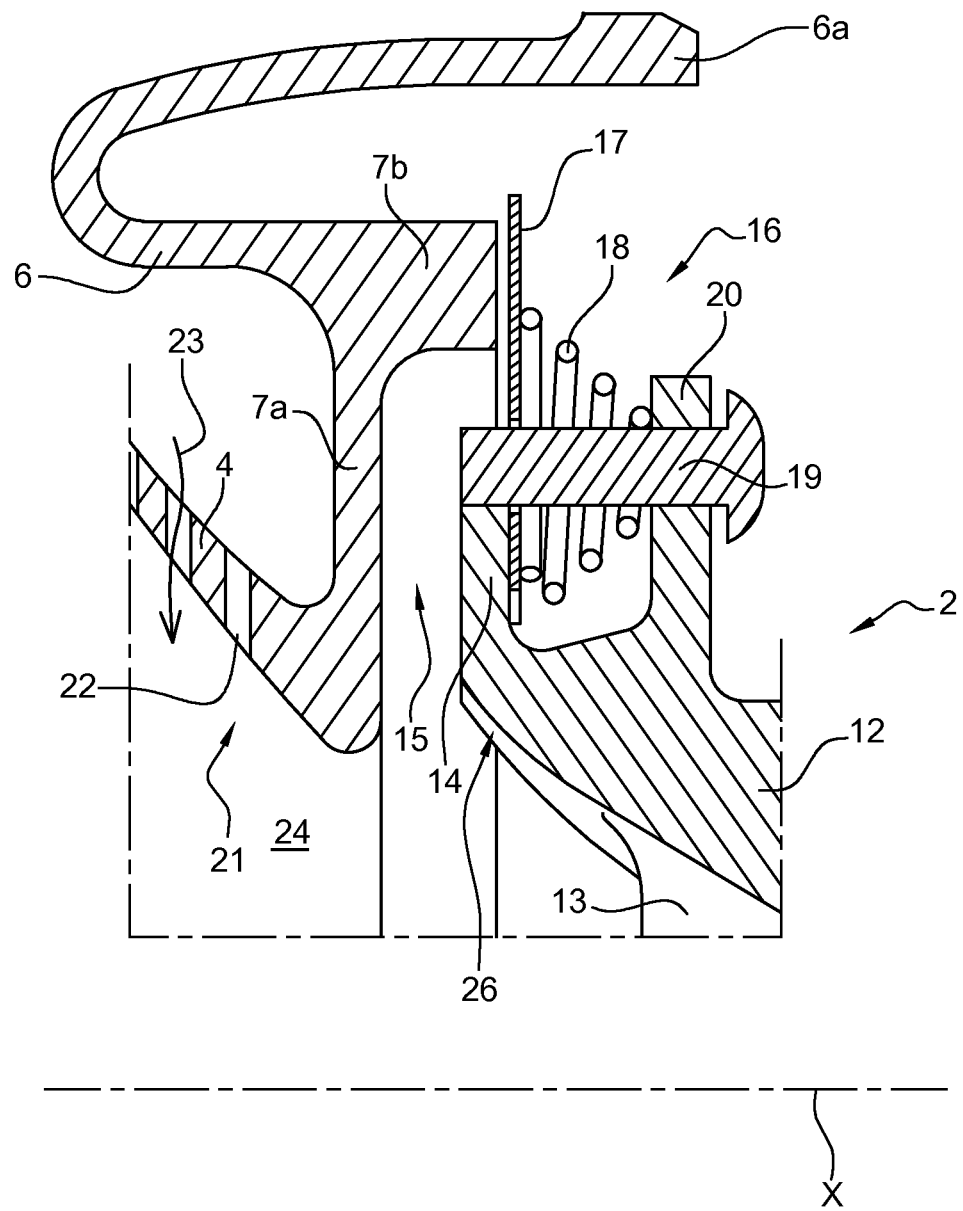
FIG. 2 is a detailed view of FIG. 1.
Figure 3:
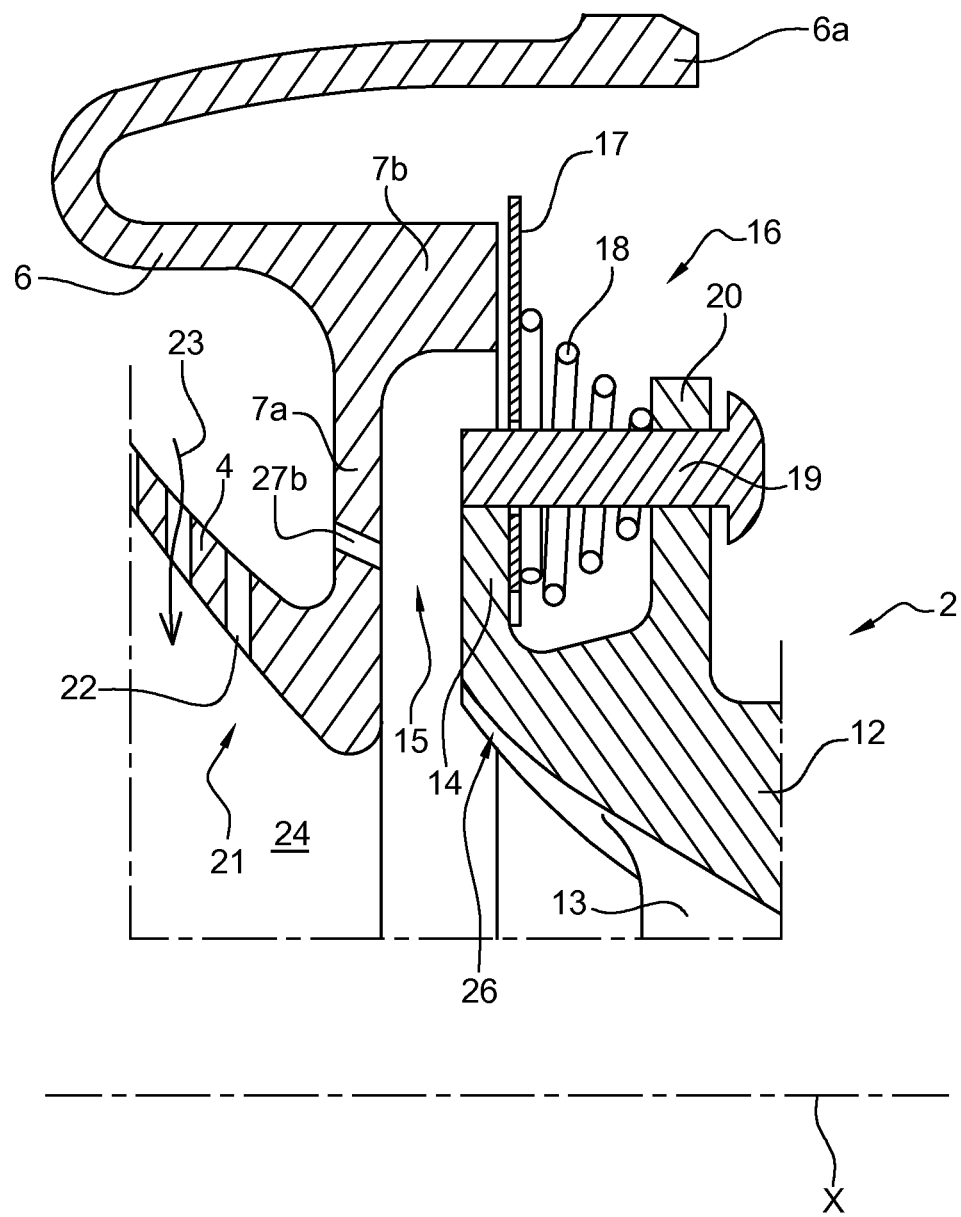
FIG. 3 is a view corresponding to FIG. 2 and illustrates an embodiment of the invention.
Figure 4:
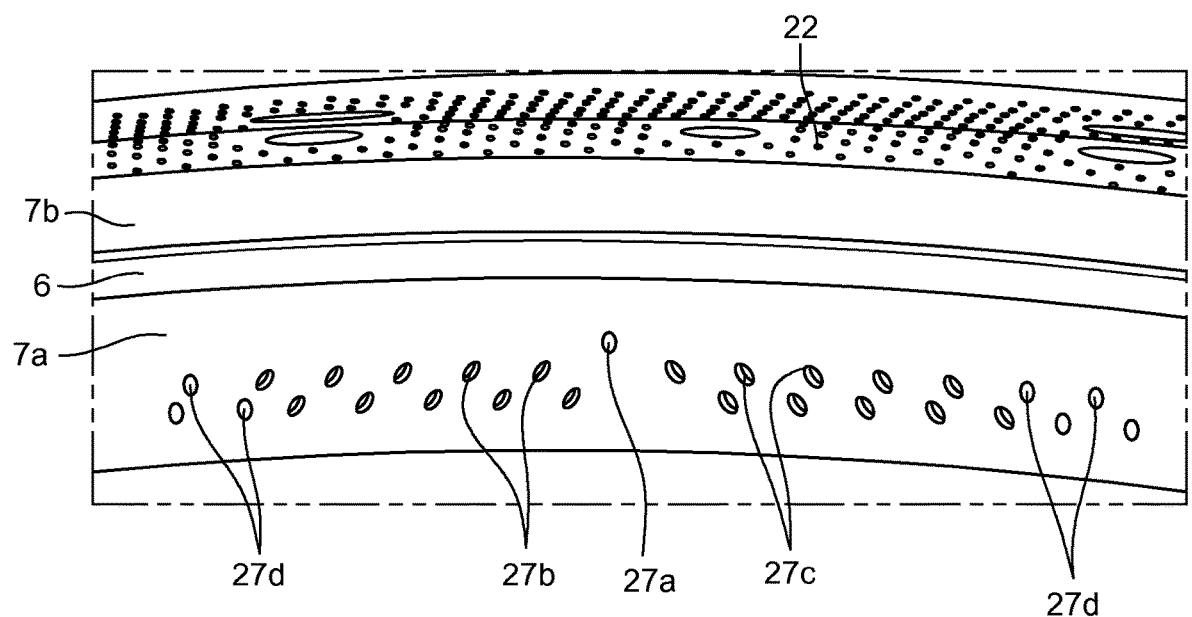
FIG. 4 is a perspective view of a part of an external shell of the combustion chamber belonging to the assembly in FIG. 3.

FIGS. 3 and 4 show an assembly for a turbomachine according to an embodiment of the invention. As previously, said assembly comprises an annular combustion chamber 1 of a turbomachine, such as an airplane turbojet or turboprop engine, arranged downstream of a compressor and a diffuser (not shown), and upstream of an inlet distributor 2 of a high-pressure turbine.

Combustion chamber 1 consists of inner and outer shells 3, 4, connected upstream to an annular chamber bottom wall.

The downstream ends of shells 3, 4 have internal and external flanges 6. Each flange 6 is annular and has a U-shaped or pin-shaped section. Each flange 6 extends radially inwards or outwards and has a radial portion 7a attached to the inner shell 3 or outer shell 4 of combustion chamber 1. The free end 6a of each flange 6 is furthermore intended to cooperate with an inner housing 8 or an outer housing 9 of chamber 1. A cylindrical part 7b extends downstream from the radial part 7a of flange 6.

Distributor 2 is attached downstream of chamber 1 by suitable means and consists of inner 11 and outer 12 platforms which are connected to each other by substantially radial vanes 13. The outer platform 12 of distributor 2 is axially aligned with the downstream end portion of the outer shell 4 of chamber 1, and its inner platform 11 is axially aligned with the downstream end portion of the inner shell 3 of chamber 1. The upstream end of each platform 11, 12 of distributor 2 has a radial flange 14 of smaller size than the radial part 7a of the corresponding flange 6 of combustion chamber 1.

The upstream end of each platform 11, 12 of distributor 2 generally forms a setback 26 or descending step to avoid the formation of a hot flow shut-off point from combustion chamber 1. As an alternative, a rising step can be formed, which is not shown. A distributor assembly 2 is mounted downstream of the combustion chamber and comprises several distributors whose platforms are ring sectors, with the distributor platforms mounted circumferentially end to end to create a fluid flow channel downstream of the combustion chamber.

Radial parts 7a and flanges 14 delimit, for each shell 3, 4, an internal annular gap 15 which opens at one end into chamber 1 and is closed at its other end by sealing means 16.

These sealing means 16 have sealing lamellae 17 extending radially and circumferentially along each distributor 2 sector. Each lamella 17 can be sealingly supported on a radial face of the corresponding flange 14 of distributor 2 and on the free end of the axial part 7b of the corresponding flange 6 of combustion chamber 1. Lamellae 17 are held in contact with said parts 7b, 14 by means of elastic return means.

These elastic means are e.g. conically shaped coil springs 18 mounted around screws 19 which are screwed into lugs 20 extending radially from the corresponding platform 11, 12 of distributor 2. The downstream parts 21 of the inner and outer shells 3, 4 may have multi-perforations 22.

The radial section 7a of the flange has areas opposite a distributor 2 with orifices 27a, 27b, 27c, 27d.

In particular, each zone comprises a circumferentially median orifice 27a oriented in the axial direction, orifices 27b and 27c located circumferentially on either side of the median orifice 27a, and orifices 27d located at the circumferential ends of each zone, said orifices 27d being oriented in the axial direction.

Orifices 27b and 27c are inclined in two opposite circumferential directions and form angles of between 15 and 75° with the axial plane, e.g. an angle of the order of ±45°. The positive or negative sign of the angle depends on the inclination of the orifices.

Orifices 27a to 27d are cylindrical and open upstream into gaps 24 and 25 and downstream into annular gap 15. Each orifice has a diameter of between 0.1 mm and 6 mm, for example of the order of 1 mm.

Each zone may have a single central orifice 27a, ten orifices 27b, ten orifices 27c, and two pairs of three or four orifices 27d, as shown in FIG. 4.

The downstream ends of orifices 27a to 27d, which open into annular gap 15, may be spaced from each other in the radial direction and/or in the circumferential direction by a distance of 0.1 to 6 mm.

Orifices 27b, 27c and 27d are here arranged in two rows radially offset from each other and are arranged alternately. Orifice 27a is offset radially away from the gas flow path from orifices 27b, 27c and 27d.

During operation of the turbomachine, bypass air 23 flows into spaces 24 and 25 bounded respectively by the outer housing 9 and outer shell 4 on the one hand, and the inner housing 8 and inner shell 3 on the other. This bypass air 23 passes through the multi-perforations 22, so as to limit the heating of the downstream parts 21 of the inner and outer platforms 3, 4, and passes through orifices 27a to 27d, so as to cool the corresponding platforms 11, 12 of the high pressure distributor 2.

The invention claimed is:

1. An assembly for a turbomachine, comprising:
   a combustion chamber comprising a radially extending downstream flange positioned at a downstream end; and
   a distributor disposed downstream of the combustion chamber and comprising a platform from which at least one vane extends radially, the platform comprising an upstream edge extending radially and delimiting, with the downstream flange disposed opposite, a gap opening into the combustion chamber at its radially inner end and closed at its radially outer end by sealing means fixed to the distributor,
   wherein the downstream flange of the combustion chamber comprises at least one rectilinear cooling orifice passing through said flange and opening into the gap opposite the platform of the distributor, and
   the radial portion of the downstream flange of the combustion chamber has at least two cooling orifices passing through the downstream flange and opening into the gap, two of said orifices extending in two directions forming an angle with each other.

2. The assembly according to claim 1, wherein the sealing means comprise at least one radially and circumferentially extending lamella, which bears axially on the downstream flange of the combustion chamber and on the upstream edge of the distributor.

3. The assembly according to claim 1, further comprising at least one orifice inclined in a first circumferential direction and at least one orifice inclined in a second circumferential direction, opposite to the first circumferential direction.

4. The assembly according to claim 1, further comprising at least one axially oriented orifice.

5. The assembly according to claim 3, further comprising at least one first axially oriented orifice and at least one second and one third orifice located circumferentially on either side of the first orifice, the second and third orifices being inclined in two opposite circumferential directions.

6. The assembly according to claim 5, further comprising at least one fourth orifice and at least one fifth orifice, situated respectively circumferentially on either side of the second and third orifices, opposite the first orifice, the fourth and fifth orifices being oriented axially.

7. The assembly according to claim 1, further comprising at least two orifices radially and circumferentially offset from each other.

8. The assembly according to claim 1, wherein edges of the orifices opening into the gap are offset from one another by a distance of between 0.1 and 6 mm.

* * * * *